United States Patent
Konta et al.

(10) Patent No.: US 9,069,721 B2
(45) Date of Patent: Jun. 30, 2015

(54) STORAGE CONTROL DEVICE, COMPUTER-READABLE RECORDING MEDIUM, AND METHOD THEREOF

(71) Applicant: FUJITSU LIMITED, Kawasaki-shi, Kanagawa (JP)

(72) Inventors: Yoshihito Konta, Kawasaki (JP); Koutarou Nimura, Kawasaki (JP); Marie Abe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 74 days.

(21) Appl. No.: 13/913,777

(22) Filed: Jun. 10, 2013

(65) Prior Publication Data

US 2014/0006744 A1    Jan. 2, 2014

(30) Foreign Application Priority Data

Jun. 29, 2012   (JP) ................................. 2012-147876

(51) Int. Cl.
  *G06F 13/00*  (2006.01)
  *G06F 13/16*  (2006.01)
  *G06F 13/38*  (2006.01)
  *G06F 13/10*  (2006.01)

(52) U.S. Cl.
  CPC ............ *G06F 13/1689* (2013.01); *G06F 13/10* (2013.01); *G06F 13/385* (2013.01)

(58) Field of Classification Search
  CPC ................................ G06F 13/385; G06F 13/10
  See application file for complete search history.

(56) References Cited

U.S. PATENT DOCUMENTS

| 6,532,502 | B1 | 3/2003 | Takaki | |
|---|---|---|---|---|
| 2007/0022142 | A1* | 1/2007 | Palmer et al. | ................. 707/200 |

FOREIGN PATENT DOCUMENTS

| JP | 9-258907 | 10/1997 |
|---|---|---|
| JP | 2000-181853 | 6/2000 |
| JP | 2001-249770 | 9/2001 |

\* cited by examiner

*Primary Examiner* — Zachary K Huson
(74) *Attorney, Agent, or Firm* — Staas & Halsey LLP

(57) ABSTRACT

A storage control device obtains an access request having a random characteristic or an access request having a sequential characteristic, compares a threshold with a ratio of the number of commands corresponding to the access request having the random characteristic to the number of commands corresponding to the access request having the sequential characteristic, generates and issues a command to which first identification information for instructing a storage to determine an execution order of commands issued to the storage has been assigned or a command to which second identification information for instructing the storage to execute commands in an order in which the storage received the commands has been assigned, in accordance with a result of the comparison, measures a time from issuance of the command to a response from the storage when the obtained access request has a random characteristic, and adjusts the threshold.

9 Claims, 6 Drawing Sheets

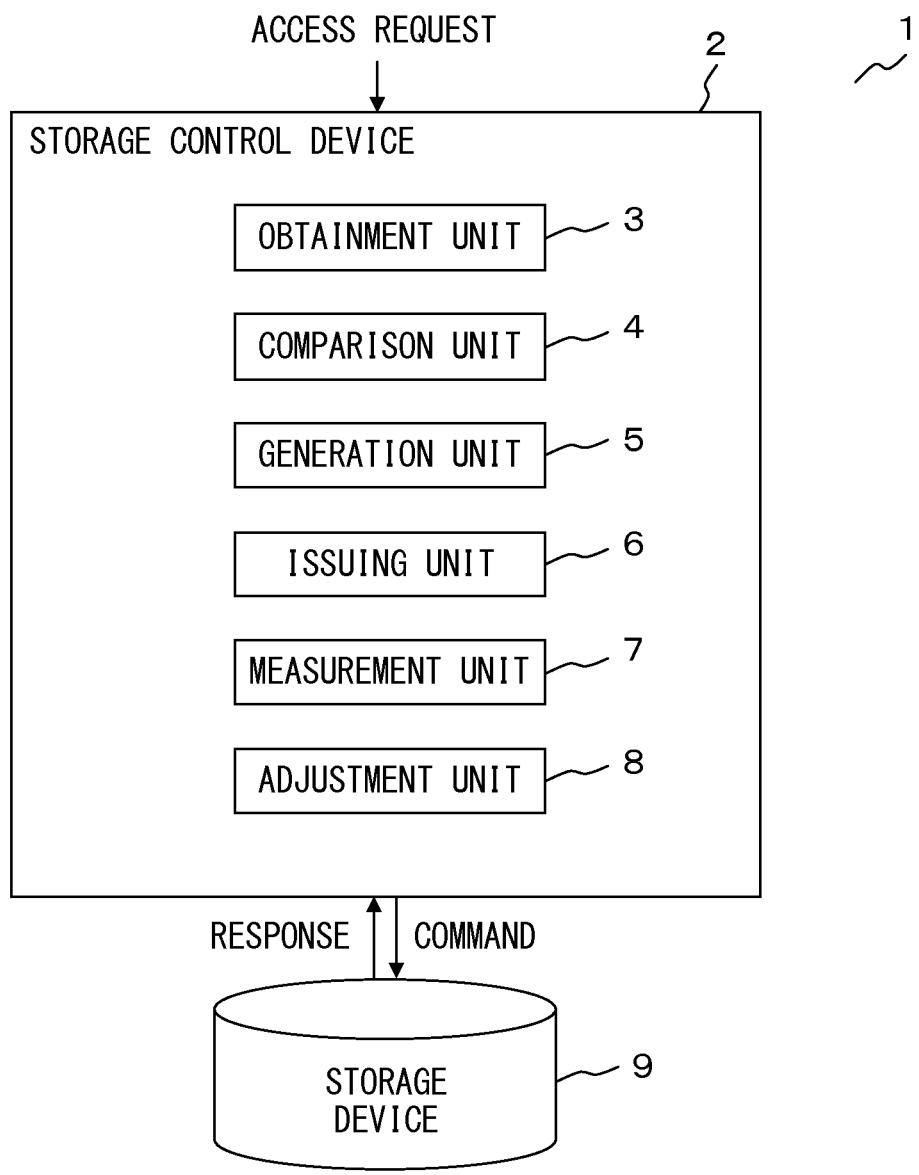
F I G. 1

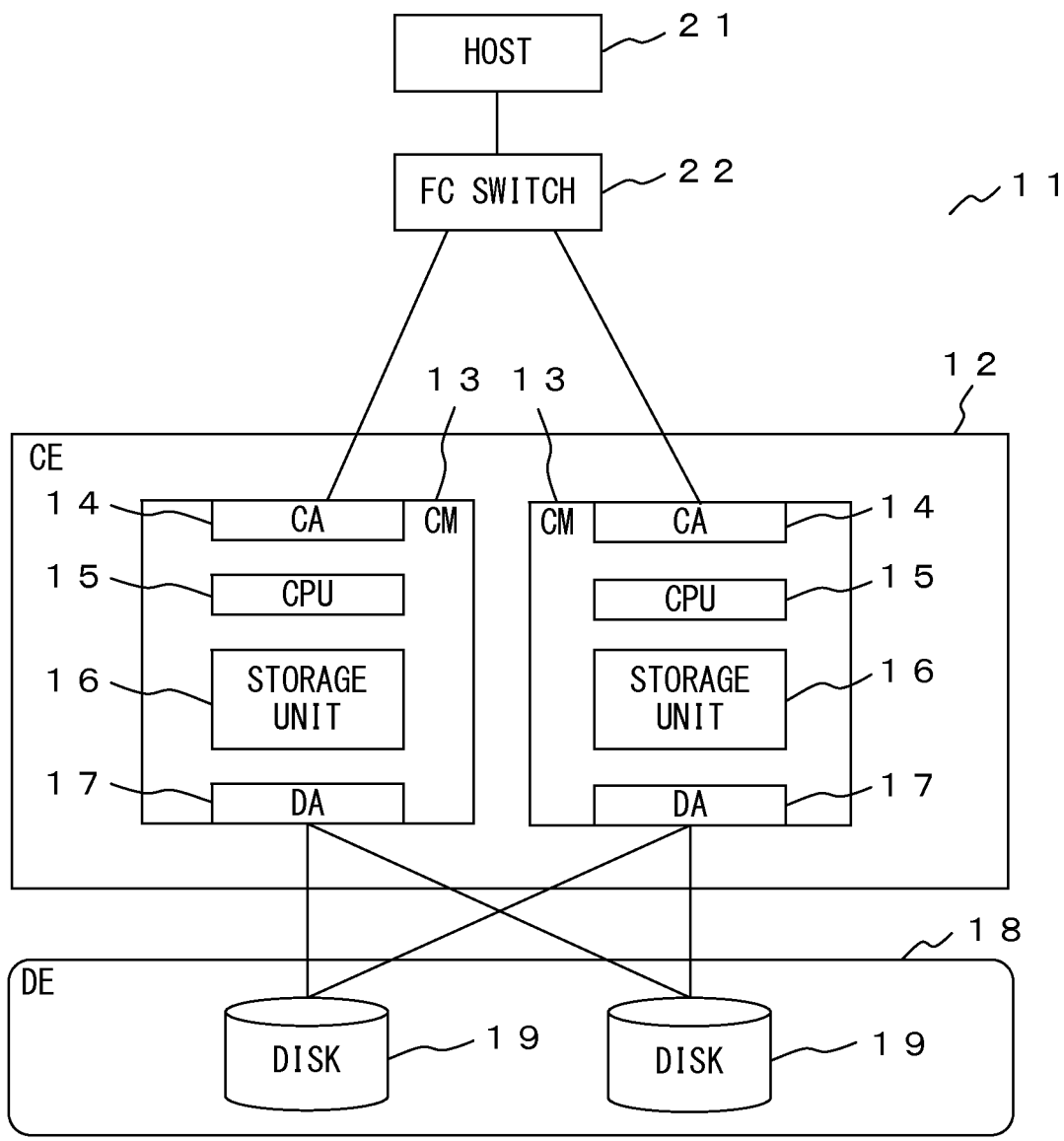
F I G. 2

|  | PARAMETER |
|---|---|
| NUMBER OF TIMES OF ISSUING SEQUENTIAL CHARACTERISTIC | i |
| PRESCRIBED VALUE | N |
| CURRENTLY MEASURED RESPONSE TIME | T1 |
| MOST RECENT PREVIOUS MEASURED RESPONSE TIME | T2 |
| MOST RECENT PREVIOUS UPDATE DIRECTION FLAG | D |

F I G. 4

STORAGE CONTROL DEVICE, COMPUTER-READABLE RECORDING MEDIUM, AND METHOD THEREOF

CROSS-REFERENCE TO RELATED APPLICATION

This application is based upon and claims the benefit of priority of the prior Japanese Patent Application No. 2012-147876, filed on Jun. 29, 2012, the entire contents of which are incorporated herein by reference.

FIELD

The embodiments described herein are related to a technique of controlling a storage system.

BACKGROUND

A storage device is a disk storage system including a plurality of disk devices. In a disk device, data can be recorded on disks. Methods of accessing a disk include sequential access and random access. According to sequential access, accesses are made sequentially to successive blocks on a disk. According to random access, accesses are made to blocks existing discretely on a disk.

SCSI (Small Computer System Interface) has standardized messages for controlling accesses to a disk device. A "Simple Queue Tag" message is a message that makes a disk device determine execution order in order to control command queues and optimize the display device. An "Ordered Queue Tag" message is a message for executing a queue that has already received a queuing process, that is, a message for executing commands in an order in which the disk device received those commands. A "Head Of Queue Tag" message is a message for making a disk device execute a command the most preferentially.

When an access is made to a disk, a Simple Queue Tag is often specified. When a Simple Queue Tag has been specified, commands related to access destinations having closer physical addresses are processed preferentially, which is a characteristic of this message.

It is assumed, for example, that sequential accesses concentrate in a disk in greater numbers than random accesses. Also, it is assumed that the access destinations of commands A, B, D, and E are blocks 1, 2, 3, and 4, which are successive on the disk, that the access destination of command C is a block that is apart from blocks 1 through 4 on the disk, and that the disk device has received command 1 (sequential access), command 2 (sequential access), command 3 (random access), command 4 (sequential access), and command 5 (sequential access) in this order. In such a case, the processes are executed in the order of command 1 (sequential access), command 2 (sequential access), command 4 (sequential access), command 5 (sequential access), and command 3 (random access).

The techniques below are examples of techniques of securing responses in relation to a disk device.

As a first technique, there is a technique that performs control in such a manner that command processes in a disk device are promoted when a command that has not been executed after a prescribed time has elapsed is detected.

As a second technique, there is a technique as follows. A command batch generation unit of an external storage control unit reads, from the reception queue as a group (batch), the number of commands so that the sum of process time prediction values for those commands, predicted by a prediction value table, is a prescribed period of time. The batch is stored in a transmission queue. The command queuing unit selects a disk device having the highest prediction value for the command processing time, and extracts commands so as to issue the command to the corresponding disk device. This process is repeated. When the transmission queue becomes empty, a next batch is read.

As a third technique, there is a technique as follows. A storage device has a function of queuing commands, and may sometimes execute commands in an order different from the order of receiving those commands, and has a function of limiting the number of times that a command is overtaken by other commands received later. Two or more values are prepared for the storage device so as to limit the number of times overtaking occurs. Further, separate values are applied to the storage device for read commands and write commands.

Patent Document 1: Japanese Laid-open Patent Publication No. 2000-181853

Patent Document 2: Japanese Laid-open Patent Publication No. 9-258907

Patent Document 3: Japanese Laid-open Patent Publication No. 2001-249770

SUMMARY

According to an aspect of the embodiments, a storage control device includes a memory and a processor. The processor obtains an access request having a random characteristic, which gives instructions to access a storage device for storing information by a random access or an access request having a sequential characteristic, which gives instructions to access the storage device by a sequential access. The processor compares a threshold with a ratio of a number of commands issued to the storage device corresponding to the access request having the random characteristic to a number of commands issued to the storage device corresponding to the access request having the sequential characteristic. The processor generates a command to which first identification information for instructing the storage device to determine an execution order of commands issued to the storage device has been assigned or a command to which second identification information for instructing the storage device to execute commands in an order in which the storage device received the commands has been assigned, in accordance with a result of a comparison between the threshold and the ratio of issued commands. The processor issues the generated command to the storage device. The processor measures a time from issuance of the command to a response from the storage device when the obtained access request has a random characteristic. The processor adjusts the threshold in accordance with a result of a comparison between a currently measured time obtained by the measurement and a most recent previous measured time obtained by the measurement.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram of a storage system according to the present embodiment;

FIG. 2 illustrates an example of the storage system according to the present embodiment;

FIG. 4 illustrates an example of parameters managed by the controller module according to the present embodiment;

DESCRIPTION OF EMBODIMENTS

Figure 3:
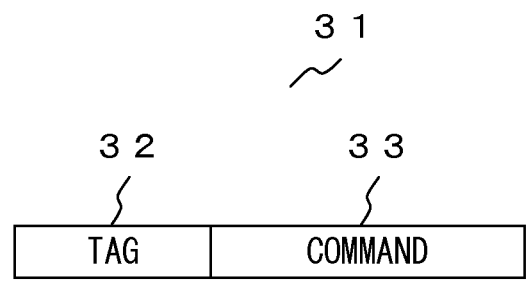
FIG. 3 illustrates a data configuration of command information transmitted from a controller module to a disk device.

As described above, when a Simple Queue Tag has been specified, priority is given to processes for commands specified by sequential accesses, and processes for commands specified by random accesses are left unprocessed. Although there is a technique of processing commands that have been left unprocessed on a disk, such commands are left for a long period of time.

To prevent this problem, a possible approach is a method in which an Ordered Queue Tag is issued when a command that has been left unexecuted for a prescribed period of time is detected, similarly to the first technique.

However, as described above, according to the first technique, an Ordered Queue Tag is issued for all cases where commands not executed for a prescribed period of time have been detected, and thus too many Ordered Queue Tags may be issued, preventing the optimization of the disk device. As a result, the performance of the disk device may be degraded. According to the first technique, an Ordered Queue Tag is specified regardless of the address positions of disk accesses. It is assumed that, for example, addresses A, B, and C are arranged in an ascending order. It is also assumed that commands for accessing the disk were issued in an order of address C, address A, and address B. When optimization is not performed in the disk device, those addresses are accessed in order of the issuing of the commands. When an access is to be made to address A after an access to address C, the disk has to spin from address C to address A, i.e., almost 360 degrees, which causes a waiting time, leading to a delay in making responses to accesses to the disk.

In addition to the above first technique, the following method may be possible.

In a case when, for example, sequential write (a writing processes based on sequential accesses) and random read (a reading processes based on random accesses) are concentrated, it may be possible to specify an Ordered Queue Tag for random read.

However, with a combination other than a combination of sequential write and random read, such as combinations of sequential read and random read or sequential write and random write, or the like, it is not possible to solve the problem of delay in making responses because an Ordered Queue Tag is not specified. Also, open systems other than main frames do not employ this method. Also, even when sequential write and random read are concentrated, and performance degradation is not caused, an Ordered Queue Tag is issued, which may lead to performance degradation. Further, the time for issuing an Ordered Queue Tag continues for about, for example, one second, which may also lead to performance degradation.

It may also be possible to issue an Ordered Queue Tag for m (m is an integer) disk devices. In such a case, system engineers or customer engineers have to set the value of m manually.

However, when an inappropriate value has been set to m, desirable effects will not be achieved. When a large value is mistakenly set to m, there is a risk that processes of commands based on random accesses will be delayed when sequential accesses and random accesses are concentrated. When a small value is mistakenly set to m, the performance may be degraded if input and output are based on only sequential accesses when sequential accesses and random accesses are concentrated. Also, it is difficult for a server to set a value that is appropriate to the accessing method. Also, when an access pattern is changed so as to adjust to the system, the value of m may have to be changed. Also, when the number of logical unit numbers (LUNs) increases in the same RAID (Redundant Arrays of Independent Disks) group, the value of m may have to be changed.

The present invention provides, as an aspect, a technique of preventing delays in making responses to access requests based on random access when accesses to a storage device include both access requests based on sequential access and access requests based on random access.

Accordingly, in the present embodiment, explanations will be given for a technique of controlling accesses to a disk device such as a harddisk drive (HDD) included in a storage device. Specifically, explanations will be given for a technique, performed by a controller of a storage device, of preventing delays in making responses to random accesses, which become obvious when sequential accesses and random accesses are concentrated in a disk device.

FIG. 1 is a block diagram of a storage system according to the present embodiment. The storage system 1 includes a storage control device 2 and a storage device 9. The storage device 9 stores information. An example of the storage device 9 is the disk devices 19, which will be explained later.

The storage control device 2 includes an obtainment unit 3, a comparison unit 4, a generation unit 5, an issuing unit 6, a measurement unit 7, and an adjustment unit 8. An example of the storage control device 2 is a controller module 13, which will be explained later.

The obtainment unit 3 obtains an access request including a random characteristic that gives instructions to access the storage device 9 by random access or obtains an access request including a sequential characteristic that gives instructions to access the storage device 9 by sequential access. An example of the obtainment unit 3 is a process in S1 performed by a CPU 15, which will be explained later.

The comparison unit 4 compares a threshold with the ratio between the number of commands issued to the storage device 9 that corresponds to an access request having a random characteristic and the number of commands issued to the storage device 9 that corresponds to an access request having a sequential characteristic. As an example of the comparison unit 4, there is a process in S5 performed by the CPU 15, which will be explained later.

The generation unit 5 generates a command assigned first identification information or a command assigned second identification information in accordance with the result of the comparison between the ratio of the numbers of the issued commands and the threshold. The first identification information instructs the storage device 9 to determine the order of executing commands issued to the storage device 9. The second identification information instructs the storage device 9 to execute commands in the order in which the storage device 9 received them. An example of the generation unit 5 is processes in S4 and S9 performed by the CPU 15, which will be explained later.

The issuing unit 6 issues a generated command to the storage device 9. As an example of the issuing unit 6, there are processes in S10 and S12 performed by the CPU 15, which will be explained later.

The measurement unit 7 measures a time from the issuance of a command to reception of a response from the storage device 9 when an obtained access request has a random characteristic. An example of the measurement unit 7 is the process performed by the CPU 15 in S13.

The adjustment unit 8 adjusts a threshold in accordance with a result of a comparison between the currently measured time and the most recent previous measured time. An example of the adjustment unit 8 is the processes performed by the CPU 15 in S14 through S16.

By employing this configuration, it is possible to prevent delays in making responses to accesses having a random characteristic, which become obvious in a situation where there are both accesses having a sequential characteristic and accesses having a random characteristics (Read/Write).

When the currently measured time is shorter than the most recent previous measured time, the adjustment unit 8 subtracts a prescribed value from a threshold at the point in time at which the prescribed value was subtracted from the threshold the most recent previous time, and adds a prescribed value to the threshold at the point in time at which the prescribed value was added to the threshold the most recent previous time. Also, when the currently measured time is longer than the most recent previous measured time, the adjustment unit 8 adds a prescribed value to a threshold when the prescribed value was subtracted from the threshold the most recent previous time, and subtracts a prescribed value from the threshold when the prescribed value was added to the threshold the most recent previous time.

By employing this configuration, it is possible to assign an Ordered Queue Tag to a command in accordance with an increase or decrease in a response time for a random access so that the timing of executing a command based on a random access can be adjusted.

Also, the generation unit 5 generates a command to which the first identification information has been assigned when the address of the access destination of a command issued the most recent previous time is on the same track as the address of the access destination of an access request having a random characteristic.

By employing this configuration, whether or not the address of an access destination is close to the address of the access destination of a different command in the storage device 9 is determined, and thereby it is possible to fully utilize the function of optimizing accesses that the storage device 9 has.

Explanations will be given for the present embodiment in more detail hereinbelow.

FIG. 2 illustrates an example of a storage system according to the present embodiment. A storage system 11 is a disk storage system including the plurality of disk devices 19. For the sake of redundancy, there are two access paths for each of the disk devices 19 for accesses to the disk devices 19 from a host computer (referred to as a host hereinafter). Also, data itself is distributed to a plurality of disks by using RAID, and is stored in a redundant state.

A storage system 11 includes a host 21, a fiber channel (FC) switch 22, and a controller enclosure (CE) 12, and a drive enclosure (DE) 18. In the storage system 11, the drive enclosure (DE) 18 and the host 21 are connected to each other via the FC switch 22 and the controller module (CM) 13.

The host 21 communicates with the controller enclosure (CE) 12 via the FC switch 22 so as to read data from the disk devices 19 included in the drive enclosure (DE) 18 or to write data to the disk devices 19. Although FIG. 2 illustrates one host 21, a plurality of hosts 21 may be connected to the controller enclosure (CE) 12.

The controller enclosure (CE) 12 includes a plurality of controller modules (CMs) 13. The controller modules (CMs) 13 control the operations of the disk devices 19. Each of the controller modules (CM) 13 function as a storage control device. The storage system 11 includes two or more of the controller modules (CMs) 13 so as to secure redundancy.

The controller module (CM) 13 transmits an input/output (I/O) command as access instruction information to the drive enclosure (DE) 18 so as to issue an instruction to input data to and output data from a storage area of the disk device 19. When there are no responses even after the access monitoring time has elapsed after the issuance of an input/output instruction, the controller module (CM) 13 transmits to the drive enclosure (DE) 18 an abort instruction command, which interrupts this I/O process.

The controller module (CM) 13 includes a channel adapter (CA) 14, a central processing unit (CPU) 15, a storage unit 16, and a device adapter (DA) 17. The channel adapter (CA) 14, the CPU 15, the storage unit 16, and the device adapter (DA) 17 are connected via an internal bus.

The channel adapter (CA) 14 is connected to the host 21 via the FC switch 22. The CPU 15 controls the controller module (CM) 13 entirely.

The storage unit 16 is a device for storing information such as a cache memory, a ROM (Read Only Memory), a RAM (Random Access Memory), or the like. The storage unit 16 stores data for operating the controller modules (CMs) 13, programs according to the present embodiment, data used in the present embodiment, and the like.

The device adapter (DA) 17 is connected to the drive enclosure (DE) 18. The CPU 15 transmits data to and receives data from the drive enclosure (DE) 18 via the device adapter (DA) 17.

The drive enclosure (DE) 18 includes one or more drive enclosures (DEs). The drive enclosure (DE) 18 includes a plurality of disk devices 19, and has a RAID configuration that has taken redundancy into consideration. The disk devices 19 are not limited to hard disk drives (HDDs), and may be solid state drives (SSDs), magneto-optical disk drives, or the like. Also, the present embodiment has used the disk devices 19 as an example of a storage device; however, the scope of the present invention is not limited to this example, and any storage devices that allow both the random access method and the sequential access method may be used.

FIG. 3 illustrates a data configuration of command information transmitted from the controller module to a disk device. Access request information 31 includes a tag field 32 and a command field 33. In the tag field 32, queue tags based on the SCSI standard such as "Simple Queue Tag", "Ordered Queue Tag", "Head Of Queue Tag", or the like are set. In the command field 33, commands related to a data write instruction and a data read instruction are set.

FIG. 4 illustrates an example of parameters managed by a controller module according to the present embodiment. The controller module (CM) 13 stores parameters such as the number of times of issuing sequential characteristic i (i is an integer), prescribed value N (N is an integer), current response time T1 (T1 is a real number), most recent previous response time T2 (T2 is a real number), most recent previous update direction flag D, and the like in the storage unit 16 (RAM, etc.).

The number of times of issuing sequential characteristic i represents the number of times that a command is issued to the disk device 19 in response to an access request having a sequential characteristic. Zero (0) is stored as the initial value for i. Prescribed value N (N is an integer) is a threshold for the number of times of issuing sequential characteristic i, and is defined in advance.

As current response time T1, a currently measured time from the issuance of a command to the reception of information in response to that command is stored. As most recent previous response time T2, a most recent previous measured time from the issuance of a command to the reception of information in response to that command is stored.

Most recent previous update direction flag D is information for determining whether a prescribed value was added to prescribed value N or subtracted from prescribed value N the most recent previous time, and flag information such as, for example, "+" or "−", "1" or "0", or the like is stored. Note that while "1" is used as a prescribed value in the present embodiment, the scope of the present invention is not limited to this example.

Figure 5A:
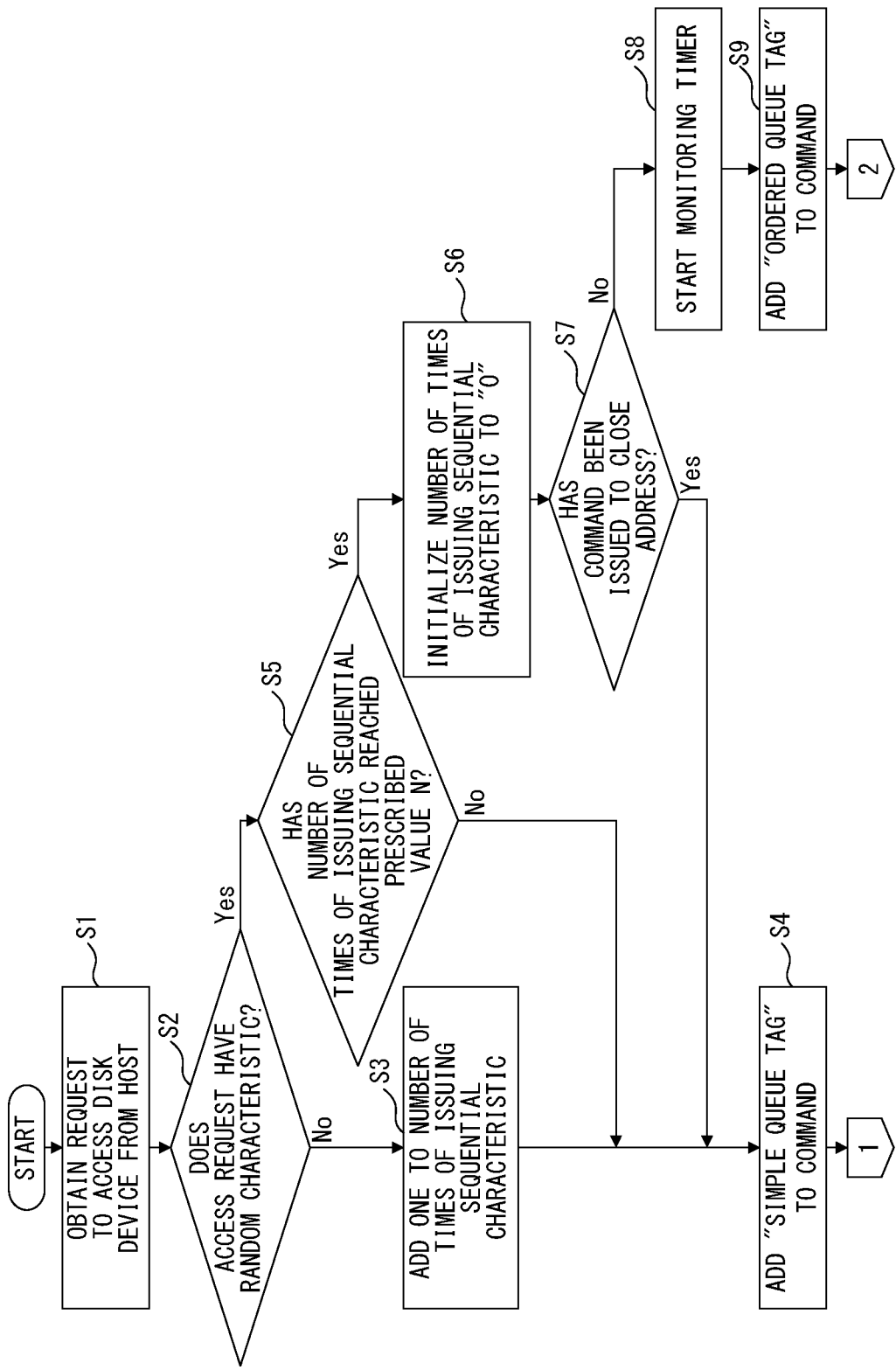
FIGS. 5A and 5B illustrate a first flowchart of a process performed by the controller module according to the present embodiment.
Figure 5B:
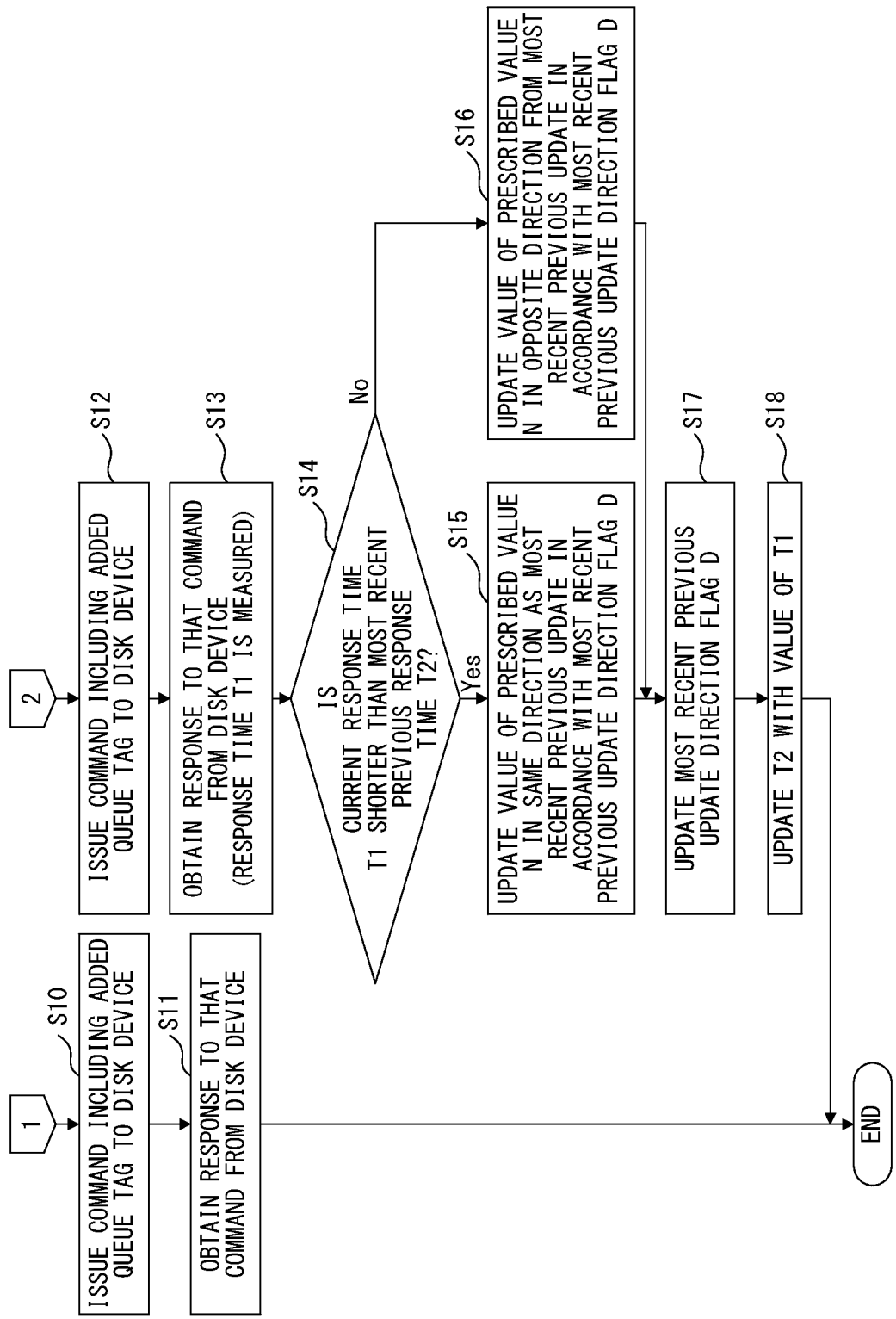

FIG. 5A and FIG. 5B illustrate a flow of a process performed by a controller module according to the present embodiment. The process explained below is performed by the controller module (CM) 13, or specifically by the CPU 15.

First, the controller module (CM) 13 obtains a request to access the disk device 19 from the host 21 via the FC switch 22 and the channel adapter (CA) 14 (S1).

The controller module (CM) 13 determines whether the access request has a sequential characteristic or a random characteristic in accordance with the address of the area to be accessed (S2). In other words, the controller module (CM) 13 determines that the request has a sequential characteristic when the addresses of the access destinations are successive, and determines that the request has a random characteristic when the addresses are not successive.

When the access request has been determined to have a sequential characteristic (No in S2), the controller module (CM) 13 adds one to the number of times of issuing sequential characteristic i (S3). Further, the controller module (CM) 13 generates a command to which a queue tag "Simple Queue Tag" has been added in accordance with the access request obtained from the host 21 (S4).

When the access request has been determined to have a random characteristic (Yes in S2), the controller module (CM) 13 determines whether or not the number of times of issuing sequential characteristic i has reached prescribed value N (S5).

When the number of times of issuing sequential characteristic i has not reached prescribed value N (NO in S5), the controller module (CM) 13 generates a command to which a queue tag "Simple Queue Tag" has been added in accordance with an access request obtained from the host 21 (S4).

When the number of times of issuing sequential characteristic i has reached prescribed value N (Yes in S5), the controller module (CM) 13 initializes the number of times of issuing sequential characteristic i to zero (S6).

After the initialization of the number of times of issuing sequential characteristic i, the controller module (CM) 13 determines whether or not the address of the access area of a preceding command is close to the address of the access area of the access request having a random characteristic that is to be issued (S7). The expression "close" in this example means, for example, that the address of the access area of the preceding command and the address of the access area of an access request having a random characteristic to be issued are on the same track of a disk.

When the address of the access area of the preceding command is close to the address of the access area of the access request having a random characteristic to be issued (Yes in S7), the controller module (CM) 13 performs a process as follows. The controller module (CM) 13 generates a command to which a queue tag "Simple Queue Tag" has been added in accordance with an access request obtained from the host 21 (S4).

The controller module (CM) 13 issues to the disk device 19 a command including a queue tag added in S4 (S10). The controller module (CM) 13 obtains response information (S11) regarding that command from the disk device 19, and transmits the response information to the host 21.

When the address of the access area of the preceding command is not close to the address of the access area of the access request having a random characteristic to be issued (No in S7), the controller module (CM) 13 starts monitoring the timer (S8). Thereafter, the controller module (CM) 13 generates a command to which a queue tag "Ordered Queue Tag" has been added (S9) in accordance with the access request obtained from the host 21.

The controller module (CM) 13 issues to the disk device 19 a command including a queue tag added in S9 (S12). The controller module (CM) 13 obtains response information to that command from the disk device 19 (S13), and returns that response information to the host 21. Upon this returning, the controller module (CM) 13 measures time (response time) T1 between the issuance of the command in S12 and the reception of the response information for the command in S13.

The controller module (CM) 13 determines whether or not currently measured response time T1 is shorter than most recent previous measured response time T2 (S14).

When currently measured response time T1 is shorter than most recent previous measured response time T2 (Yes in S14), the controller module (CM) 13 updates prescribed value N in the same direction as the most recent previous update and in accordance with most recent previous update direction flag D (S15). When prescribed value N was updated toward the positive side of the most recent previous time (when "+" has been set to the most recent previous update direction flag D), the controller module (CM) 13 updates prescribed value N further toward the positive side this time. When prescribed value N was updated toward the negative side of the most recent previous time (when "−" has been set to prescribed value N), the controller module (CM) 13 updates prescribed value N further toward the negative side this time. For example, when "1" was added to prescribed value N the most recent previous time (when "+" has been set to most recent previous update direction flag D), the controller module (CM) 13 further adds "1" to prescribed value N this time. When "1" was subtracted from prescribed value N the most recent previous time (when "−" has been set to most recent previous update direction flag D), the controller module (CM) 13 further subtracts "1" from prescribed value N this time.

When currently measured response time T1 is equal to or greater than most recent previous measured response time T2 (No in S14), the controller module (CM) 13 updates prescribed value N in the opposite direction from the most recent previous update (S16). In other words, when prescribed value N was updated toward the positive side of the most recent previous time (when "+" has been set to most recent previous update direction flag D), the controller module (CM) 13 updates prescribed value N toward the negative side. When prescribed value N was updated toward the negative side of the most recent previous time (when "−" has been set to prescribed value N), the controller module (CM) 13 updates prescribed value N toward the positive side. For example, when "1" was added to prescribed value N the most recent previous time (when "+" has been set to most recent previous update direction flag D), the controller module (CM) 13 subtracts "1" from prescribed value N this time. When "1" has been subtracted from most recent previous update direction flag D the most recent previous time (when "−" has been set to most recent previous update direction flag D), the controller module (CM) 13 adds "1" to prescribed value N this time.

After the process in S15 or S16, the controller module (CM) 13 updates most recent previous update direction flag D in accordance with whether prescribed value N has been incremented or decremented (S16). In other words, when "1" has been added to prescribed value N, the controller module (CM) 13 sets "+" to most recent previous update direction flag D. When "1" has been subtracted from prescribed value N, the controller module (CM) 13 sets "−" to most recent previous update direction flag D.

The controller module (CM) 13 further updates most recent previous measured response time T2 with the value of currently measured response time T1 (S17).

Each time an access request is issued from the host 21, the controller module (CM) 13 performs the processes of S1 through S18.

As described above, according to the present embodiment, the controller module (CM) 13 determines whether each request to access the disk device 19 has a sequential characteristic or a random characteristic. The controller module (CM) 13 specifies "Ordered Queue Tag" in a queue tag on the basis of the ratio of the random characteristic 1 to n, which is the number of issued commands having a sequential characteristic (=prescribed value N), and issues a command to the disk device 19.

When "Ordered Queue Tag" has been specified in a queue tag, the controller module (CM) 13 checks a response time before the reception of a response made from the disk device 19 to the issued command. When a response time of a random characteristic is better than the response time that is held currently, the controller module (CM) 13 updates the value of command issuance number n in the same direction as the most recent previous update. When the response time of a random characteristic is worse than the response time held currently, the controller module (CM) 13 updates the value of command issuance number n in the direction opposite from the most recent previous update. The controller module (CM) 13 adjusts command issuance number n of "sequential characteristic: n and random characteristic: 1" so that the response time is optimum.

Thereby, it is possible to prevent delays in making responses to accesses having a random characteristic, which become obvious when there are both accesses to a disk device having a sequential characteristic and accesses to a disk device having a random characteristic.

However, when the address of the access area of a preceding command (regardless of whether it has a sequential characteristic or a random characteristic) is close to the address of the access area of an access request having a random characteristic that is to be issued, the controller module (CM) 13 performs the following process: The controller module (CM) 13 sets "Simple Queue Tag" in Queue Tag as an exception, and issues a command.

Thereby, it is possible to fully utilize an access optimizing function included in the disk device 19 and to prevent a response delay by determining whether or not addresses of access destinations on a disk are close to each other. This guarantees optimum responses from the disk device.

As an aspect of the present invention, it is possible to prevent a delay in making responses to access requests based on random access when access requests to a storage device include both access requests based on sequential access and access requests based on random access.

Note that the present embodiment is not limited to the above described embodiments, and various configurations or embodiments may be employed without departing from the spirit of the present embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control device comprising:
a memory; and
a processor that performs a process including:
    obtaining an access request having a random characteristic which gives instructions to access a storage device for storing information by a random access, or an access request having a sequential characteristic which gives instructions to access the storage device by a sequential access;
    comparing a threshold with a ratio of a number of commands issued to the storage device corresponding to the access request having the random characteristic to a number of commands issued to the storage device corresponding to the access request having the sequential characteristic;
    generating a command to which first identification information for instructing the storage device to determine an execution order of commands issued to the storage device has been assigned or a command to which second identification information for instructing the storage device to execute commands in an order in which the storage device received the commands has been assigned, in accordance with a result of a comparison between the threshold and the ratio of issued commands;
    issuing the generated command to the storage device;
    measuring a time from issuance of the command to a response from the storage device when the obtained access request has a random characteristic; and
    adjusting the threshold in accordance with a result of a comparison between a currently measured time obtained by the measurement and a most recent previous measured time obtained by the measurement.

2. The storage control device according to claim 1, wherein:
the adjustment subtracts a prescribed value from the threshold when a prescribed value was subtracted from the threshold a most recent previous time, and adds a prescribed value to the threshold when a prescribed value was added to the threshold the most recent previous time, when the currently measured time is shorter than the most recent previous measured time.

3. The storage control device according to claim 1, wherein:
the adjustment adds a prescribed value to the threshold when a prescribed value was subtracted from the threshold a most recent previous time, and subtracts a prescribed value from the threshold when a prescribed value was added to the threshold the most recent previous time, when the currently measured time is longer than the most recent previous measured time.

4. A storage control device according claim 1, wherein:
the generation generates a command to which the first identification information has been assigned when an address of an access destination of a command issued a most recent previous time is on a same track as an address of an access destination of an access request having a random characteristic that is to be issued.

5. A non-transitory computer-readable recording medium having stored therein a program for causing a computer to execute a digital signature process comprising:
obtaining an access request having a random characteristic which gives instructions to access a storage device for storing information by a random access, or an access request having a sequential characteristic which gives instructions to access the storage device by a sequential access;
comparing a threshold with a ratio of a number of commands issued to the storage device corresponding to the access request having the random characteristic to a number of commands issued to the storage device corresponding to the access request having the sequential characteristic;
generating a command to which first identification information for instructing the storage device to determine an execution order of commands issued to the storage device has been assigned or a command to which second identification information for instructing the storage device to execute commands in an order in which the storage device received the commands has been assigned, in accordance with a result of a comparison between the threshold and the ratio of issued commands;
issuing the generated command to the storage device;
measuring a time from issuance of the command to a response from the storage device when the obtained access request has a random characteristic; and
adjusting the threshold in accordance with a result of a comparison between a currently measured time obtained by the measurement and a most recent previous measured time obtained by the measurement.

6. The non-transitory computer-readable recording medium according to claim 5, wherein:
the adjustment subtracts a prescribed value from the threshold when a prescribed value was subtracted from the threshold a most recent previous time, and adds a prescribed value to the threshold when a prescribed value was added to the threshold the most recent previous time, when the currently measured time is shorter than the most recent previous measured time.

7. The non-transitory computer-readable recording medium according to claim 5, wherein:
the adjustment adds a prescribed value to the threshold when a prescribed value was subtracted from the threshold a most recent previous time, and subtracts a prescribed value from the threshold when a prescribed value was added to the threshold the most recent previous time, when the currently measured time is longer than the most recent previous measured time.

8. The non-transitory computer-readable recording medium according to claim 5, wherein:
the generation generates a command to which the first identification information has been assigned when an address of an access destination of a command issued a most recent previous time is on a same track as an address of an access destination of an access request having a random characteristic that is to be issued.

9. A method of controlling a storage, the method comprising:
obtaining an access request having a random characteristic which gives instructions to access a storage device for storing information by a random access, or an access request having a sequential characteristic which gives instructions to access the storage device by a sequential access, by using a computer;
comparing a threshold with a ratio of a number of commands issued to the storage device corresponding to the access request having the random characteristic to a number of commands issued to the storage device corresponding to the access request having the sequential characteristic, by using the computer;
generating a command to which first identification information for instructing the storage device to determine an execution order of commands issued to the storage device has been assigned or a command to which second identification information for instructing the storage device to execute commands in an order in which the storage device received the commands has been assigned, in accordance with a result of a comparison between the threshold and the ratio of issued commands, by using the computer;
issuing the generated command to the storage device, by using the computer;
measuring a time from issuance of the command to a response from the storage device when the obtained access request has a random characteristic, by using the computer; and
adjusting the threshold in accordance with a result of a comparison between a currently measured time obtained by the measurement and a most recent previous measured time obtained by the measurement, by using the computer.

* * * * *

UNITED STATES PATENT AND TRADEMARK OFFICE
CERTIFICATE OF CORRECTION

| | | |
|---|---|---|
| PATENT NO. | : 9,069,721 B2 | Page 1 of 1 |
| APPLICATION NO. | : 13/913777 | |
| DATED | : June 30, 2015 | |
| INVENTOR(S) | : Yoshihito Konta et al. | |

It is certified that error appears in the above-identified patent and that said Letters Patent is hereby corrected as shown below:

In the claims

Claim 4, Column 11, Line 1

Delete "according" and insert --according to--, therefor.

Signed and Sealed this
Twenty-seventh Day of October, 2015

Michelle K. Lee
*Director of the United States Patent and Trademark Office*